United States Patent [19]

Mangels

[11] 3,983,198
[45] Sept. 28, 1976

[54] METHOD OF INCREASING THE OXIDATION RESISTANCE OF SILICON NITRIDE

[75] Inventor: John A. Mangels, Allen Park, Mich.

[73] Assignee: Ford Motor Company, Dearborn, Mich.

[22] Filed: Feb. 12, 1975

[21] Appl. No.: 549,415

[52] U.S. Cl. .................................. 264/65; 106/55; 106/73.5; 264/66; 423/344; 423/406; 427/94; 427/399
[51] Int. Cl.² ...................... F27B 9/04; F27B 9/10
[58] Field of Search ............... 427/399, 94; 106/69, 106/55, 73.5; 423/344, 406; 264/65, 66

[56] References Cited
UNITED STATES PATENTS

| | | | |
|---|---|---|---|
| 3,222,438 | 12/1965 | Parr et al. | 423/344 X |
| 3,226,194 | 12/1965 | Kuntz | 423/406 X |

FOREIGN PATENTS OR APPLICATIONS

| | | | |
|---|---|---|---|
| 970,639 | 9/1964 | United Kingdom | 423/344 |
| 1,164,418 | 9/1969 | United Kingdom | |

OTHER PUBLICATIONS

*Special Ceramics,* British Ceramic Research Assn., 1960, pp. 120–121.

*Primary Examiner*—Michael R. Lusignan
*Attorney, Agent, or Firm*—William E. Johnson; Keith L. Zerschling

[57] ABSTRACT

A method of increasing the oxidation resistance of silicon nitride is disclosed. A furnace is preheated to a temperature in the range of 2500°F to 2750°F. The silicon nitride body to be treated is inserted into the preheated furnace. The silicon nitride article is maintained in the furance for a period of time sufficient to develop an oxidation resistant surface on the article. The period of time is generally in the range from one-half hour to five hours.

5 Claims, No Drawings

METHOD OF INCREASING THE OXIDATION RESISTANCE OF SILICON NITRIDE

This application results from work carried on for the Department of the Army under Contract Number DAAG-46-71-C-0162.

BACKGROUND OF THE INVENTION

Silicon nitride bodies having a density less than theoretical are porous enough to permit the migration of oxygen therein. When such porous bodies are exposed to a high operating temperature, for example, at a temperature of about 1900°F, some of the silicon nitride article oxidizes to produce silicon dioxide which expands upon cooling and causes a weakening of the structure.

If a silicon nitride article having a density in the range of 69 to 82 percent theoretical is oxidized for a period of 200 hours at a temperature of 1900°F, the strength of the material can be reduced by as much as 50 percent. Because of this oxidation problem associated with less than theoretically dense silicon nitride, the material generally would not be suitable for use in forming portions of a gas turbine engine designed to operate at high temperatures.

It is an object of this invention to provide a method of increasing the oxidation resistance of a silicon nitride article. It is a further object of this invention to provide an economical method for treating silicon nitride articles in order to increase their useful life and oxidation resistance at high temperatures so that the silicon nitride article may be used in high temperature environments.

SUMMARY OF THE INVENTION

The method of this invention is directed to a process for increasing the oxidation resistance of a silicon nitride article. In general, the method is initiated by preheating a furnace to a temperature in the range from 2500°F to 2750°F. The silicon nitride article to be treated is inserted into the preheated furnace. The silicon nitride article is maintained in the furnace for a period of time sufficient to develop an oxidation resistant surface on the article. In general, the period of heating the article consumes a time from one-half hour to five hours. An oxidizing atmosphere is maintained in the furnace.

DESCRIPTION OF THE PREFERRED EMBODIMENT

In order to illustrate the method of this invention, a base line condition and several examples departing therefrom will be described. All of the samples treated are silicon nitride articles of about 80% theoretical density. These articles have a density of about 2.55 grams per cc. For the base line treatment several silicon nitride articles were subjected to an oxygen environment for a period of 200 hours and maintained at a temperature of 1900°F. It was found that these articles had a change of weight in the range from 3.5 to 4.7 percent and contained from 9.3 to 11.4% oxygen. The strength of the articles decreased from 36 to 43% after the 200 hours. The articles had a change in thermal expansion of +450 ppm.

As a second test, a set of silicon nitride articles of about 80% theoretical density were treated by preheating a furnace to a temperature of 2450°F. The silicon nitride articles were placed in the furnace for one and one-half hours and then removed. The articles were then oxidized for a period of 200 hours at 1900°F. These articles had a weight change (which indicates an oxygen pickup) of from 0.7 to 0.85 percent and had a loss in strength of about 25 percent.

In another test, silicon nitride articles were maintained in a 2500°F over for a period of one hour and then subjected to an oxidizing environment at 1900°F for a period of 200 hours. These articles had an average change of weight upon oxidation of 0.4 percent and contained an average 2.3 percent oxygen when analyzed.

Another set of samples were treated for four and one-half hours in a furnace maintained at 2500°F. After the heat treatment the samples were oxidized for a period of 200 hours at 1900°F. Average weight change indicative of oxygen pickup was 0.5 percent.

Another set of samples were treated in a 2700°F furnace for a period of three quarters of an hour. These samples were oxidized at 1900°F for a period of 200 hours. These samples had a positive average weight change of 0.5% upon oxidation and contained 1.9 percent oxygen. The average reduction of strength in the articles was only 4 percent and there was no change in the thermal coefficient of expansion.

As a general rule, the silicon nitride article may be treated in an oxygen environment maintained at a temperature in the range of 2500°F to 2750°F. The period of treatment may be from one-half to five hours with the higher temperatures being associated with the shorter treatment times. It is believed that the treatment develops an oxidation resistant skin on the surface of the article which seals off the pours of the article thereby reducing the amount of oxygen which can migrate into the article.

Having described my invention, I claim the following:

1. A method of increasing the oxidation resistance of a silicon nitride article which comprises the steps of:
   preheating a furnace containing an oxidizing atmosphere to a temperature in a range from 2500°F to 2750°F;
   inserting the silicon nitride article into the preheated furnace; and
   maintaining the silicon nitride article in the furnace for a period of time sufficient to develop an oxidation resistant surface on the article.

2. The method of claim 1 wherein: said period o time is from one-half hour to five hours.

3. The method of claim 1 wherein: said temperature is 2500°F, and said time period is four and one-half hours.

4. The method of claim 1 wherein: said temperature is 2700°F and said time period is three-quarters of an hour.

5. The method of claim 1 wherein: an oxidizing atmosphere is established in said furnace.

* * * * *